Oct. 16, 1945.   R. H. OSTERGREN   2,386,879
STRAIN GAUGES AND METHODS OF PRODUCING THEM
Filed Sept. 17, 1943
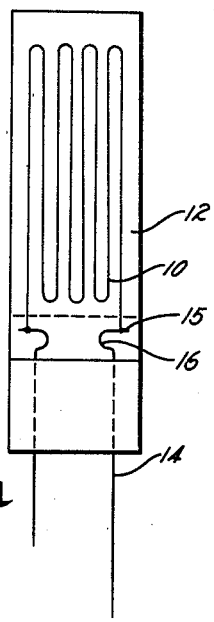
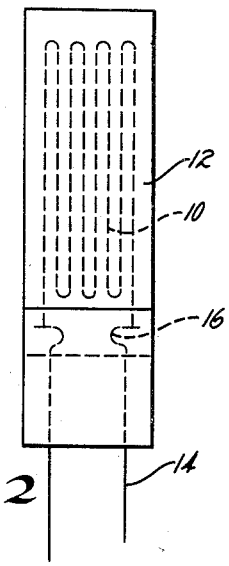
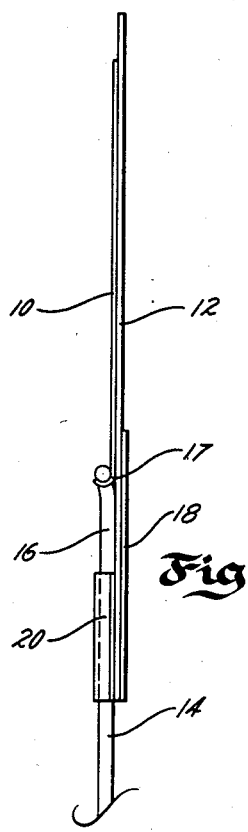
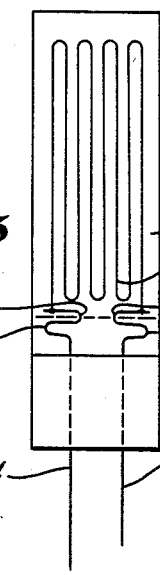
Ralph H. Ostergren
INVENTOR.
BY Edwin Coates
ATTORNEY Patented Oct. 16, 1945

2,386,879

UNITED STATES PATENT OFFICE 2,386,879

STRAIN GAUGE AND METHOD OF PRODUCING IT

Ralph H. Ostergren, Los Angeles, Calif., assignor to Douglas Aircraft Company, Inc., Santa Monica, Calif.

Application September 17, 1943, Serial No. 502,852

18 Claims. (Cl. 201—63)

This invention relates to improvements in measuring means known as strain gauges, of the kind comprising a length of fine resistance wire of the order of 1 to 2 mils diameter, wound into a grid formed of a series of closely spaced straight runs of wire connected by loops of small diameter, the grid being cemented on a thin tough backing member, which serves as a mount to enable the strain gauge to be cemented to a part to be tested.

The invention also comprises improvements in certain steps necessary to produce strain gauges and particularly to the finishing of said gauges.

When working with measuring means of such relatively small size great care has to be taken to insure that the accuracy of the gauge is not adversely affected by handling which, though without effect on materials of usual strength, might very easily seriously impair a strain gauge of the type referred to.

One of the more difficult steps in making strain gauges is the proper attachment of leads to the fine resistance wire of the gauge, which is too fragile to be used as leads. The leads must be so attached as to avoid transmission of stresses from the leads to the resistance wire.

It is an object of the invention to provide a strain gauge in which the leads are secured to the resistance wire in such manner as to minimize the transfer of stresses from the wire leads to the fine resistance wire.

A further object of the invention is to strengthen the strain gauge backing at the part adjacent the point of connection of the leads and the resistance wire.

A still further object of the invention is to form the junction between the leads and the resistance wire in such a way as to absorb the stresses set up at this point in use and thereby avoid injury to the strain gauge.

Still other objects of the invention may hereinafter appear in the following specification and/or drawing in which forms of strain gauges are shown which have been used with satisfactory results, but the invention is not to be understood as limited by the illustrated embodiments thereof but only as defined by the scope of the appended claims.

In the drawing, in which identical numerals indicate identical parts,

Figure 1 is a fragmentary face view of one form of a strain gauge with leads connected to the resistance wire according to one form of the invention.

Figure 2 is a view of the back of the strain gauge shown in Figure 1.

Figure 3 is a face view of another form of the connection between the leads and the resistance wire made according to the invention.

Figure 4 is a detail side view on an enlarged scale, showing the arrangement of the different parts of a strain gauge of the form shown in Figures 1 and 2 constructed according to the invention.

In the drawing, forms of strain gauge are indicated as produced by the strain gauge making apparatus forming the subject matter of the copending patent application of W. D. Van Dyke, Serial No. 496,231. By the use of the apparatus referred to, a continuous length of fine resistance wire in the form of a grid is cemented uniformly to a thin tough backing, but the grid has to be furnished with leads in a later operation. The considerations to be taken into account in this latter operation, which forms the subject matter of this invention, will be explained in order that the importance of the various steps of the method will be appreciated.

It is important that the utility value of the delicate strain gauge should not be upset by the operation of adding the leads. When adding the leads according to the procedure of the invention, the value of the gauge reading is held to ±1% of the desired figure.

Since the wire leads, preferably of fine tinned copper wire, are not insulated at the point of attachment to the resistance wire, care must be taken not to puncture the backing of the gauge, thus creating leakage paths for the electric current. This involves careful preparation of the ends of the lead wire to be soldered to remove any roughness or edges caused by cutting the length of wire.

There should be no tendency of the leads to separate the resistance wire from the backing by exerting a pull thereon. This necessitates securing the leads to the backing by cementing them thereto and preferably providing a reinforcement acting to hold the leads on the backing. Also the soldering of the resistance wire to the leads must be so done that the leads and the grid of resistance wire remain in the same plane.

Stresses due to handling of the lead wires, stresses due to the elongation of the leads being greater than that of the resistance wire, and stresses at the joint between the lead wires and the resistance wire when the gauge is subjected to alternating stresses in the test part to which the gauge is cemented, should not be directly transmitted to the resistance wire. It is therefore necessary for the reasons given to form the junction of the resistance wire and lead wire so that flexibility is obtained at the joint.

The above described considerations have been taken into account in devising the procedures constituting my invention, a preferred series of which procedures will be described with reference to the accompanying drawing which is given by way of illustration only. The scope of the invention, however, is not limited to the specific methods and procedures described, but only as defined by the appended claims.

Referring to Figure 1, the grid of resistance wire of the strain gauge is indicated at 10, the wire being cemented on a backing 12 of thin rice paper. Lead wires 14 are soldered to the ends of the resistance wire.

As shown in Figure 1 a bend 16, of generally semi-circular form, is formed at the grid end of the lead 14, the bend lying in the plane of the grid of resistance wire. The ends of the resistance wire are soldered at right angles to the tangent end 15 of the bend 16 of the lead, the end of the resistance wire being passed under and curved around the lead wire as shown at 17 in Figure 4. Pull of the lead wires therefore cannot exert any appreciable stress in a direction tending to pull the resistance wire away from the backing. The lead wires at the ends 15 are furnished in advance with a thin film of solder.

In the form of the invention illustrated in Figure 3, the end of the lead wire is provided with a double bend having curves 16 and 16′ in order to obtain an increased degree of "give" at the point of connection of the resistance wire and the leads.

Figure 4 shows the relative arrangement of the lead and resistance wires and also the positioning of a reinforcement at the lead end of the strain gauge. It will be noted that a portion of the leads is supported by the backing member 12 and is cemented thereto except for the bent portion at the end of the lead. Since most of the stresses on the strain gauge arise at the junction of the leads and the resistance wire, the gauge is strengthened at this point by additional reinforcing sheets, which may be of the same material as the backing, as indicated at 18 and 20.

In the different forms of the gauge described it will be noted that the curved portion to which the resistance wire is soldered is not cemented to the backing of the strain gauge and thus is free to yield to stresses and therefore prevent transmission of the stresses to the fine resistance wire.

Extensive use and experimentation with strain gauges was had in order to devise and manufacture gauges which would have the degree of accuracy and uniformity desired in the very numerous applications of which they are susceptible in testing materials both as raw stock and as fabricated parts of all descriptions.

The various steps in manufacturing gauges may be divided into winding, preparation of leads, calibration, and reinforcement.

This invention, as before stated, is concerned with the connection of the leads to the grid of resistance wire, with the subsequent reinforcement of the gauges, and with their calibration.

The method of carrying out these steps will now be described. The strain gauge, as produced by the strain gauge machine, consists of a grid formed of a number of closely spaced parallel wire loops of fine resistance wire having a diameter of the order of .001 to .002 inch, the gauge being formed of loops uniform as to size, length of run of wire and number of wires according to the value and type of gauge to be made. The first and last loops before attachment of the leads have a length of some inches extending at the same end of the grid for the purpose of attaching leads to the grid as later described. The grids of wire are firmly cemented throughout their length to the backing. Rice paper has been found suitable for use as the backing, a piece being cut considerably longer than the grid of wire, the paper extending beyond the end of the resistance wire at that end at which the first and last loops of resistance wire are left extending.

The lead wires are provided with curvate ends according to one or other of the forms shown in Figures 1 and 3, preferably in a jig, to secure uniformity of the leads, and are of the same length. The lead wires at the end 15 are provided in advance with a thin film of solder. The step of soldering the leads is carried out by bending the free resistance wire and paper backing away from one another and soldering the resistance wire at a definite distance from the nearest loop to a length of lead wire, by the use of a specially fine-pointed soldering iron. The soldering step is carried out in a special jig which holds the strain gauge flat enabling the free resistance wire to be brought out straight and bent round the under side of the end of the lead wire at right angles thereto as shown in Figure 4. The second lead wire is attached by a similar procedure to the other free end of the resistance wire.

After both ends of the resistance wire have been soldered to lead wires, the terminals of a galvanometer or other resistance measuring instrument are clipped to the ends of the lead wires and a reading taken. If the reading is not within the tolerance allowable for the particular type of gauge, the last made joint is loosened and remade at an appropriate point along the bend, or alternatively the length of one or other of the leads may be reduced until the reading is within the tolerance permissible. An experienced operator can very quickly calibrate a gauge to an accuracy of within ±1% by this procedure. The surplus resistance wire is then clipped off and the soldered joints examined for soundness. Any roughness that might puncture the backing is removed, and the soldered joint is washed to remove all surface flux. The cementing of the gauge is then completed by cementing the leads to the backing except immediately adjacent the soldered joint. In the case of gauges to be subjected to considerable variation of stress and therefore provided with a double curved loop as shown in Figure 3, the curved portion of the leads at the end of the lead wire is left free from the backing to insure maximum freedom of the lead ends to take up stresses, but the point at which the resistance wire is soldered to the leads is preferably, in all gauges, cemented to the backing to prevent working of the soldered connection.

The next step in the manufacture of the finished gauges is to supply reinforcements as most clearly shown in Figure 4. The reinforcement may consist of additional pieces of the backing material used to support the wire grid and is positioned to strengthen the gauge at the point of maximum wear, which is at the lead end of the gauge. At this point a piece of backing is cemented both to the face of the gauge, extending from above the curved end of the leads to the end of the backing, and on the underside of the gauge from a point under the joint between the soldered joint between the resistance wire and the leads to the end of the backing, this latter reinforcement also serving to guard against puncturing of the backing at the point of connection of the resistance wire and leads. The finished gauge is then again calibrated, by cutting a small length from a lead wire if necessary, to give the desired value with a tolerance of ±2%.

It is believed that in view of the wide usefulness of strain gauges in rapidly and accurately measuring strains arising in members from loading, from temperature or pressure changes, or from other causes and thus providing other informative data, particularly while the part under test is in use, the manufacturing method and the strain gauges produced thereby represent a valuable advance in the field of equipment for testing materials and structures.

I claim:

1. A strain gauge having a length of fine resistance wire cemented to a backing adapted to be directly secured throughout its area to a member to be tested comprising: lead wires, of heavier gauge than the resistance wire, a bend at the end of the leads at the point of connection to the resistance wire extending across and above the resistance wire, the end of the resistance wire lying against the periphery of the lead wire and being secured to said lead by a thin film of solder, the soldered joint being cemented to the backing, the bend in the lead left uncemented, and the portion of the lead wires overlying the backing being cemented to the backing.

2. A strain gauge having a length of fine resistance wire cemented to a backing adapted to be directly secured throughout its area to a member to be tested comprising: lead wires of heavier gauge than the resistance wire, a loop at the end of the leads at the point of connection to the resistance wire extending across and above the resistance wire, the end of the resistance wire lying against the periphery of the lead wire on the side opposite to the length of resistance wire of the gauge and being secured thereto by a thin film of solder, the looped portion of the lead serving to absorb stresses and prevent their transmission to the fine wire of the strain gauge, the soldered joint and the portion of the lead wires overlying the backing being cemented to the backing with the loop portion of the lead wire adjacent the said joint left free.

3. A strain gauge having a length of fine resistance wire formed into a grid cemented throughout its length to a backing adapted to be directly secured throughout its area to a member to be tested comprising: lead wires of heavier gauge than the resistance wire, a loop at the point of connection of the lead wire to the resistance wire extending across and above the resistance wire substantially at right angles thereto, the end of the resistance wire lying against the periphery of the lead wire on the side opposite to the length of resistance wire of the gauge and being secured thereto by a thin film of solder, the loop portion of the lead serving to absorb stresses and prevent their transmission to the fine wire of the strain gauge; the strain gauge resistance wire ends being cemented to the backing up to and including the soldered joint, but the bend in the lead wires being left free, and the portion of the lead wires overlying the backing leads also being cemented to the backing.

4. A strain gauge having a length of fine resistance wire cemented to a backing adapted to be directly secured throughout its area to a member to be tested, comprising: lead wires of heavier gauge than the resistance wire, the leads at the point of connection to the resistance wire being bent into a double loop of S shape, the end portion of the double loop extending across and above the resistance wire substantially at right angles thereto, the end of the resistance wire lying against the circumference of the lead wire at the free end of the bend on the side opposite to the length of resistance wire and secured thereto by a thin film of solder, the loop serving to absorb stresses and prevent their transmission to the fine wire of the strain gauge, the strain gauge resistance wire ends being cemented to the backing up to and including the soldered joint to the lead wires, and the portion of the leads overlying the backing also being cemented to the backing except at the S shaped bend.

5. A strain gauge as set forth in claim 1 and in addition, comprising: sheeted reinforcement cemented to the strain gauge at the end to which the leads are attached, said reinforcement being arranged to leave free the bend at the end of the leads to which the resistance wire is soldered.

6. A strain gauge as set forth in claim 2 and in addition, comprising: sheeted reinforcement cemented to the strain gauge at the end to which the leads are attached, said reinforcement being arranged to leave free the bend at the end of the leads to which the resistance wire is soldered.

7. A strain gauge as set forth in claim 3 and in addition, comprising: sheeted reinforcement cemented to the strain gauge at the end to which the leads are attached, said reinforcement being arranged to leave free the bend at the end of the leads to which the resistance wire is soldered.

8. A strain gauge as set forth in claim 4 and in addition, comprising: sheeted reinforcement cemented to the strain gauge at the end to which the leads are attached, said reinforcement being arranged to leave free the bend at the end of the leads to which the resistance wire is soldered.

9. A strain gauge as set forth in claim 1 and in addition, comprising: sheeted reinforcement on the face of the gauge cemented over the leads from the end of the backing to adjacent the bend in the lead wires but leaving said bend free; and a second sheeted reinforcement on the back of the strain gauge at the lead end extending from the end of the backing to beyond the bend in the lead wires and acting to reinforce the backing at the juncture of the fine resistance wire and the lead wire.

10. A strain gauge as set forth in claim 2 and in addition, comprising: sheeted reinforcement on the face of the gauge cemented over the leads from the end of the backing to adjacent the bend in the lead wires but leaving said bend free; and a second sheeted reinforcement on the back of the strain gauge at the lead end extending from the end of the backing to beyond the bend in the lead wires and acting to reinforce the backing at the juncture of the fine resistance wire and the lead wire.

11. A strain gauge as set forth in claim 3 and in addition, comprising: sheeted reinforcement on the face of the gauge cemented over the leads from the end of the backing to adjacent the bend in the lead wires but leaving said bend free; and a second sheeted reinforcement on the back of the strain gauge at the lead end extending from the end of the backing to beyond the bend in the lead wires and acting to reinforce the backing at the juncture of the fine resistance wire and the lead wire.

12. A strain gauge as set forth in claim 4 and in addition, comprising: sheeted reinforcement on the face of the gauge cemented over the leads from the end of the backing to adjacent the bend in the lead wires but leaving said bend free; and a second sheeted reinforcement on the back of the strain gauge at the lead end extending from the end of the backing to beyond the bend in the lead wires and acting to reinforce the backing at the juncture of the fine resistance wire and the lead wire.

13. A strain gauge comprising: a length of fine resistance wire having a straight section extending from at least one of its terminals; a flexible backing sheet to which the wire is bonded throughout its length; a lead wire connected to said terminal of the resistance wire, the lead wire having a portion extending in substantially the opposite direction to that of said straight section of said resistance wire and having a terminal portion proximate said portion and at a substantial angle to said direction, said terminal portion being bonded at its outer end to the terminal of said resistance wire, said terminal portion being unbonded from said backing sheet and said other portion of said lead wire being bonded to said backing sheet.

14. A strain gauge comprising: a length of fine resistance wire having a straight section extending from at least one of its terminals; a flexible backing sheet to which the wire is bonded throughout its length; a lead wire connected to said terminal of the resistance wire, the lead wire having a terminal portion bonded at its outer end to the terminal of said resistance wire, said terminal portion being non-rectilinear and unbonded from said backing sheet and a portion of said lead wire proximate to said terminal portion being bonded to said backing sheet.

15. A strain gauge, comprising: a length of fine resistance wire having a straight section extending from at least one of its terminals; a flexible backing sheet to which the wire is bonded throughout its length; a lead wire connected to said terminal of the resistance wire, the lead wire having a portion extending rectilinearly in substantially the opposite direction as that of said straight section of said resistance wire and having a terminal portion proximate said portion, said terminal portion being bonded at its outer end to the terminal of said resistance wire, said terminal portion being non-rectilinear and unbonded from said backing sheet and said other portion of said lead wire being bonded to said backing sheet.

16. A method of making strain gauges of the kind having a resistance element of fine wire cemented throughout its extent to a backing, comprising in combination the steps of: providing a length of the fine resistance element extending from each end of the cemented portion of the resistance element; providing a length of the backing extending beyond the portion of the backing cemented to the resistance element; forming lengths of lead wires with a bend at one end and applying a film of solder to said bend; bringing the extending lengths of resistance element around the solder coated ends of a pair of lead wires so that the resistance element can be laid against the extending portion of the backing throughout the length of said extending portions of the resistance element; securing the extending length of resistance element to the bend of the leads by momentarily melting the film of solder while holding the extending portion of the resistance element thereagainst until the film of solder again solidifies, obtaining a reading of the electrical resistance of the strain gauge and adjusting the effective length of the current path through the leads to bring the resistance of the gauge and leads to the desired value; and cementing the extending portions of the resistance element up to and including the soldered joint, and the portion of the leads extending from above the bend in the leads to the perimeter of the backing.

17. A method of making strain gauges as set forth in claim 16 and in addition, comprising: applying sheeted reinforcement to said strain gauge to strengthen the portion of the backing to which the leads are cemented without impairing the yieldability of the bends at the ends of the leads.

18. A method of making strain gauges as set forth in claim 16 and in addition, comprising: applying sheeted reinforcement to said strain gauge to strengthen the portion of the backing to which the leads are cemented without impairing the yieldability of the bends at the ends of the leads; and applying sheeted reinforcement to the back of the gauge to strengthen the backing under the point of juncture of the resistance element and the leads.

RALPH H. OSTERGREN.